United States Patent
Zhu et al.

(10) Patent No.: US 9,614,811 B1
(45) Date of Patent: Apr. 4, 2017

(54) COLLECTIVE OBJECTS MANAGEMENT SYSTEM WITH IMPROVED OBJECT DATA BASE MANAGEMENT

(71) Applicants: Shengbo Zhu, San Jose, CA (US); Su Shiong Huang, Bellevue, WA (US)

(72) Inventors: Shengbo Zhu, San Jose, CA (US); Su Shiong Huang, Bellevue, WA (US)

(73) Assignee: iMICRODATA CORPORATION, San Jose, CA (US)

( * ) Notice: Subject to any disclaimer, the term of this patent is extended or adjusted under 35 U.S.C. 154(b) by 0 days.

(21) Appl. No.: 14/756,580

(22) Filed: Sep. 18, 2015

(51) Int. Cl.
*G08B 5/22* (2006.01)
*H04L 29/12* (2006.01)
*G08B 5/36* (2006.01)

(52) U.S. Cl.
CPC .............. *H04L 61/609* (2013.01); *G08B 5/36* (2013.01)

(58) Field of Classification Search
CPC ...... G06Q 10/00; G06Q 10/10; G06Q 10/087; G06F 19/322
See application file for complete search history.

(56) References Cited

U.S. PATENT DOCUMENTS

| | | | |
|---|---|---|---|
| 2002/0158765 A1* | 10/2002 | Pape | A01K 11/008 340/573.3 |
| 2002/0190871 A1* | 12/2002 | Stanfield | G06F 17/30011 340/8.1 |
| 2011/0241890 A1* | 10/2011 | Zhu | G06Q 10/00 340/635 |

\* cited by examiner

*Primary Examiner* — Nabil Syed (57) ABSTRACT

A collective objects data base management system for objects such as documents contained in file folders in drawers of file cabinets. Each file folder has an electrical circuit with a visible indicator mounted on the file folder. Each folder circuit has an object receptacle microcontroller with a unique system address which enables generation of a response signal whenever an incoming address from a source is a match and activation of the visible indicator. An object container microcontroller periodically polls the object receptacle microcontrollers in the cabinet and stores an updated version of the cabinet object data base. The cabinet object data base contents are sent to a host computer, which maintains the system data base.

9 Claims, 5 Drawing Sheets

COLLECTIVE OBJECTS MANAGEMENT SYSTEM WITH IMPROVED OBJECT DATA BASE MANAGEMENT

BACKGROUND OF THE INVENTION

This invention relates to collective objects management systems in general, and in particular to an improved collective objects management system using object identification with digital addresses. More particularly, this invention relates to an improvement for a collective objects management system using object identification with digital addresses, the improvement pertaining to object data base management performed primarily within the object container in real time.

The term "collective objects management systems" is a term coined to denote systems for generally keeping track of items ("objects") in a collection of items. For example, an automobile parts warehouse at any given time has a collection of vehicle parts ("objects") in inventory. The kind and number of such parts varies every day, as parts are sold and new parts are received. In order to keep track of the number and kind of vehicle parts in inventory, some type of collective vehicle parts management system must be used. Similarly, in a semiconductor manufacturing operation, at any given time there is a collection of integrated circuits ("objects") of one or more types located somewhere in the facility, which must be accounted for using a collective integrated circuits management system. In supermarkets, a collection of a large number of different types of items, such as meats, produce, canned goods and the like is usually in inventory, with the number and types of objects varying widely on a daily basis and thus requiring a complex objects management system. In business offices and some homes, file storage cabinets are typically used to store documents used for both business and personal activities. A typical file storage cabinet has several pull-out drawers each containing a relatively large number of file folders ("objects"), with each folder containing one or more documents. In order to enable the documents contained in the various files to be readily accessed and inventoried, some type of file management system is necessary.

Commonly assigned U.S. Pat. No. 8,471,717 issued Jun. 25, 2013 for "Collective Objects Management System With Object Identification Using Addressable Decoder Units" discloses a system for managing objects distributed in an object location space. The disclosure of the '717 patent is hereby incorporated by reference. The '717 system comprises a container, such as a file drawer, having a plurality of mutually electrically isolated electrically conductive paths, at least one of which can receive address signals supplied by a source and specifying a sought object; a plurality of object receptacles positioned in the container, each of the plurality of object receptacles having (a) a plurality of electrically conductive members, each of which is electrically coupled to a different one of the plurality of mutually electrically isolated electrically conductive paths;

(b) an address decoder circuit associated to an object in the receptacle, the address decoder circuit having a unique system address, the address decoder circuit further having a plurality of electrically conductive terminals in electrical contact with the plurality of electrically conductive members; and (c) an indicator, such as a visible indicator (e.g., an LED) coupled to the address decoder circuit for activation whenever the address decoder circuit detects an address signal present on at least one of the plurality of electrically conductive members and representative of the unique system address.

The '717 system further includes a source comprising an encoder for generating the address signals, the encoder having at least one input terminal for receiving object identification signals from a supply device, at least one output terminal coupled to each address decoder circuit of the plurality of object receptacles, and circuitry for generating a signal representative of the unique system address of the object specified by the object identification signals.

In a specific embodiment, the container comprises a file folder drawer; and each object receptacle comprises a file folder having a pair of support braces, with one of the support braces containing the plurality of electrically conductive members. In this embodiment, the address decoder circuit and the indicator of each of the object receptacles are carried by one of the two support braces of each file folder.

Preferably, each file folder has an upper margin, and each indicator is mounted to the corresponding file folder in a position extending above the upper margin so as to be noticeable when the file folder drawer is in an opened position.

The file folder drawer includes at least two electrically non-conductive support members on which different ones of the plurality of mutually electrically isolated electrically conductive paths are located. One of the support braces of each of the plurality of object receptacles comprises an elongate body structure formed from an electrically non-conductive material with a pair of opposite ends, each end having a downwardly opening cut-out channel provided with a pair of spring contacts secured to the elongate body structure, with each spring contact being electrically coupled to a different one of the plurality of electrically conductive members. Each end of the one of the support braces of the plurality of object receptacles is supported by a different one of the at least two electrically non-conductive support members when received in the file folder drawer.

The two laterally spaced electrically non-conductive support members of the file folder drawer each has a width, with the width of each electrically non-conductive support member being different from the other. Similarly, the width of the cut-out channel at one of the opposite ends of the elongate body structure of each of the file folders is different from the width of the cut-out channel at the other one of the opposite ends of the elongate body structure of each of the file folders so that a given file folder can only be removably secured to the two support members in one proper orientation with each of the spring contacts in mechanical and electrical contact with the appropriate one of the electrically conductive paths.

The file folder drawer has a front panel with an additional indicator mounted thereon; and the system further includes circuitry for operating the additional indicator whenever an address decoder circuit located in the file folder drawer detects an address signal present on the at least one of the plurality, of electrically conductive members and representative of the unique system address of that address decoder.

Each address decoder circuit includes circuitry for generating a VALID signal whenever that address decoder circuit detects an address signal present on the at least one of the plurality of electrically conductive members and representative of the unique system address of that address decoder circuit.

A cabinet microcontroller supplies power signals to the plurality of object receptacles via some of the electrically conductive paths, and address signals via the at least one of the electrically conductive paths; and receives VALID signals generated by each address decoder circuit when an incoming address matches a given address decoder circuit system address. The microcontroller also includes circuitry for generating information signals identifying the location in the system of any address decoder circuit which generates a VALID signal.

The '717 technique provides objects management capability for objects distributed in an object location space which is superior to older, manual techniques implemented in the past. For example, to conduct a survey of all objects currently located somewhere in the system a host computer sends a polling inquiry to each cabinet microcontroller in the system. In the '717 system, the polling inquiry identifies a specific object receptacle by a system address and each cabinet microcontroller converts this system address to a local object receptacle address using the cabinet encoder, which presents this local object address to all object receptacles in that cabinet. If an address match occurs, a VALID signal is received by the cabinet microcontroller which composes and sends a message to the host computer confirming that the specified object receptacle has been located and specifying the cabinet and drawer location. The host computer next issues another polling inquiry identifying a different specific object receptacle, each cabinet microcontroller converts this system address to a local object receptacle address using the cabinet encoder, which presents this local object address to all object receptacles in that cabinet. If an address match occurs, a VALID signal is received by the cabinet microcontroller which composes and sends a message to the host computer confirming that the specified object receptacle has been located and specifying the cabinet and drawer location. This polling process continues until all system addresses have been processed. In the absence of any response to a given system address, the host computer will update its data base to note that an object receptacle is missing from the system. This polling technique greatly simplifies object data base management, particularly with data bases having relatively large numbers of different objects located in spatially distributed containers.

While greatly superior to the older manual process for conducting a survey of all objects in a given system, the '717 polling technique suffers from the disadvantage that, after generating a given polling inquiry system address, the host computer must wait for a response from all of the cabinet microcontrollers before generating the next polling inquiry system address. This serial polling technique unnecessarily prolongs the polling process, during which the normal object search function must be deferred until the polling process is completed or deliberately interrupted.

SUMMARY OF THE INVENTION

The invention comprises a collective objects management system with improved object data base management which substantially reduces the time required for a host computer initiated polling process to be conducted to completion. The invention also provides additional features described below which further enhance object data base management.

The invention employs a system architecture in which each object container is provided with an object container microcontroller which carries out the object polling, preferably on a periodic basis—e.g., every one second. Each object receptacle is provided with an object receptacle microcontroller capable of responding to a polling request from the object container microcontroller by sending its system identification to the object container microcontroller. The object container microcontroller stores the local object data base information containing the identification and location of each object receptacle in a local memory device. When a host computer requests a data base update, the contents of the local memory device are sent to the host computer by the object container microcontroller. If a previously present object receptacle is missing from a current poll, the missing object receptacle information is erased from the memory device and this action is reported to the host computer to update the master system data base. If a new object receptacle is found as the result of the current poll, the new identification information is entered into the memory device and the host computer is notified by the object container microcontroller. Also, when a new object receptacle is noted during a poll, an audible indicator device is activated to inform a user that the new object receptacle has been noted and entered into the system.

For a fuller understanding of the nature and advantages of the invention, reference should be made to the ensuing detailed description taken in conjunction with the accompanying drawings.

DETAILED DESCRIPTION OF THE PREFERRED EMBODIMENTS

The invention has wide application to a large variety of collective object management systems. The following is a detailed description of one application of the invention in the field of file management systems.

Figure 1:
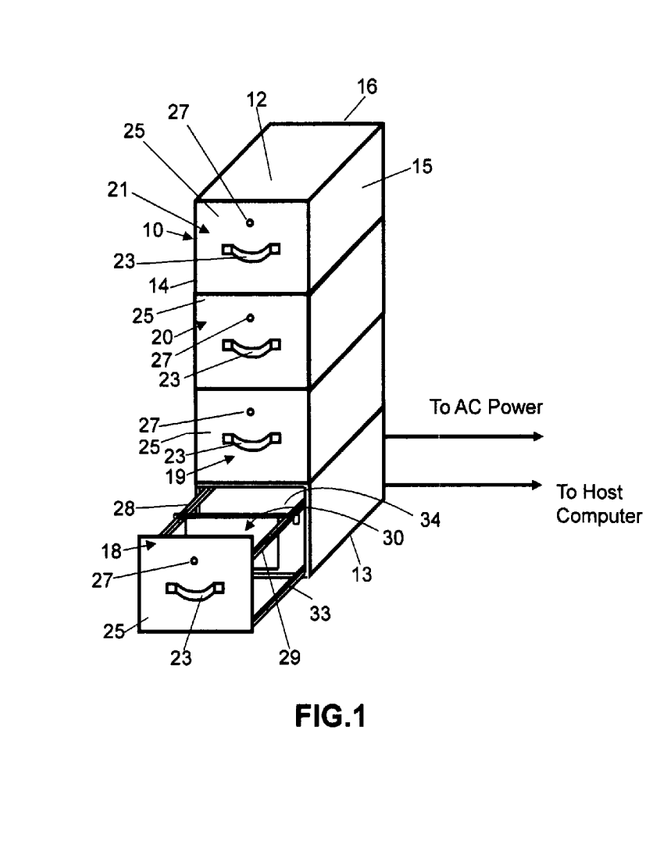
FIG. 1 is a perspective view of a multiple drawer file cabinet illustrating an implementation of the invention in a collective objects management system in which the objects are file folders housed in a file cabinet.

Turning now to the drawings, FIG. 1 is a perspective view, taken from the right front, of a first embodiment of the invention in a file storage system application and using direct electrical connections between the file cabinets and the associated computer. As seen in this Fig., a multiple drawer file cabinet 10 (four drawers illustrated) of known mechanical construction has the usual top 12, bottom 13, sides 14, 15, and back 16. Four drawers 18-21 are slidably mounted in cabinet 10, each drawer 18-21 having a drawer pull 23 mounted on a front panel 25 thereof. A visible indicator device 27 is also mounted on the front panel 25 of each drawer 18-21. Indicator 27 may comprise any one of a number of known elements capable of providing a visible signal when activated in the manner described below. Examples of suitable indicators are a conventional LED indicator, and a type 276-036 flashing LED indicator available from Radio Shack Corporation.

Figure 2:
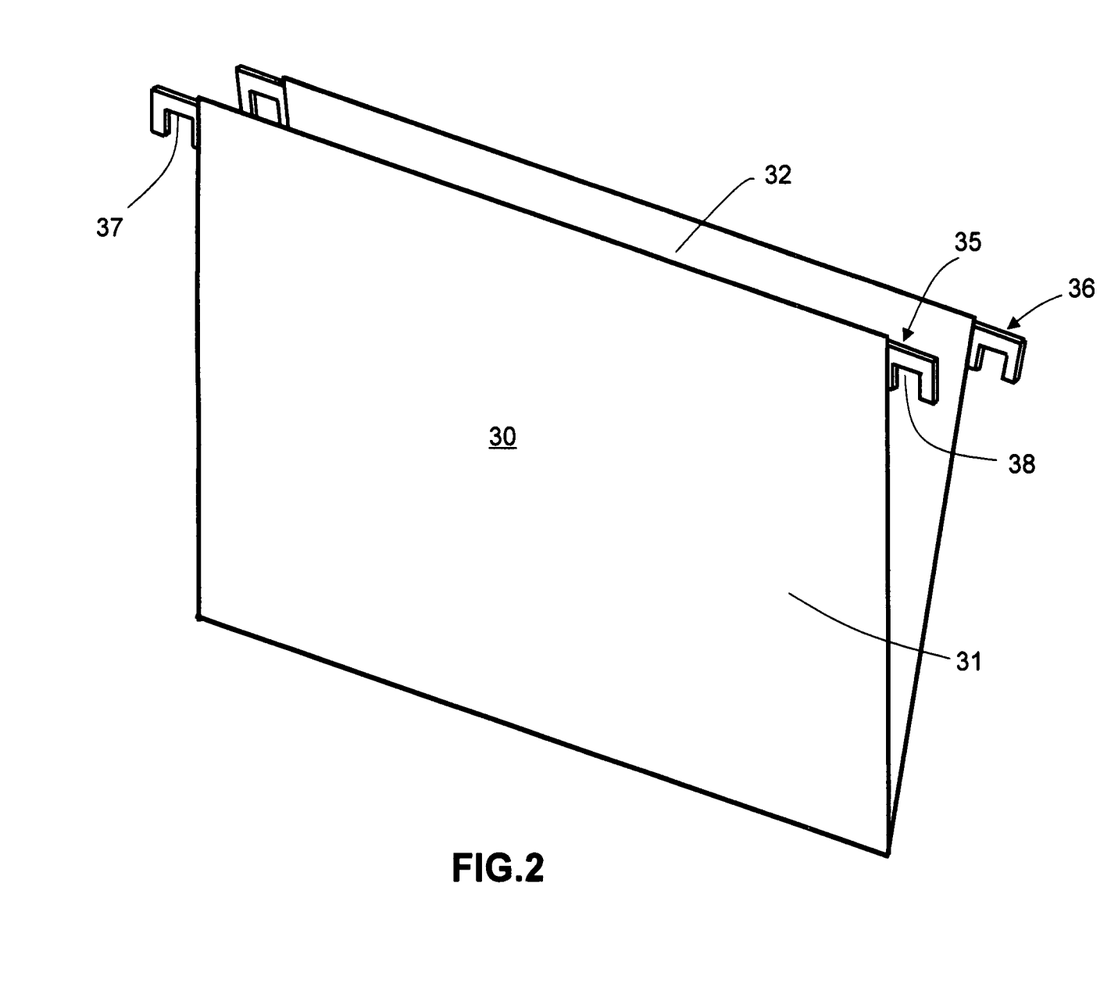
FIG. 2 is a perspective view of an object receptacle in the form of a file folder designed for use with the file cabinet of FIG. 1.

Lower-most drawer 18 is shown in the opened position in order to provide a perspective view of the basic drawer structure and the manner in which a file folder is removably supported in a file drawer. As shown, drawer 18 is provided with a pair of upper support members 28, 29 described in detail below, which serve the primary purpose of supporting individual file folders, such as file folder 30, in the drawer. Secondarily, support members 28, 29 may also provide structural rigidity for the drawer 18 itself. Drawer 18 also has a pair of lower members 32, 33 (only one of which (member 33) is visible in FIG. 1) which complete the horizontal structural elements. In a commonly used file cabinet structure, members 28, 29, 32, and 33 may form an inner frame insert (along with vertically arranged frame members) which can be physically installed in a standard drawer. To complete the drawer structure, a back 34 is connected to the members 28, 29, 32, 33. All file folders, such as folder 30, are removably supported by upper support members 28, 29 using horizontal support braces (described below) to which the folder 30 is mechanically secured. The mechanical structure of folder 30 may be conventional, as shown in FIG. 2, or may comprise the folder structure shown in FIG. 3. The structure and arrangement of drawers 19-21 are identical to that of drawer 18. As indicated by the legended lead lines shown to the lower right of file cabinet 10, an A.C. power connection provides A.C. electrical power to the electronic components described below and located within file cabinet 10. Similarly, a hard-wired connection is coupled between file cabinet 10 and an associated host computer for the purposes described below.

As best shown in FIG. 2, which is a perspective view of a typical file folder 30 adapted for use with the invention, file folder 30 is a document receptacle formed from a single sheet of suitable material (typically durable paper stock) folded about the longitudinal center. Each leaf 31, 32 of file folder 30 is provided with a mechanical brace 35, 36 each secured to the upper margin of the associated leaf 31, 32. Each brace 35, 36 is provided with a pair of downwardly opening channels, such as channels 37, 38 of brace 35, adjacent the opposite ends thereof and designed to receive the drawer support rails 28, 29 of the respective cabinet drawer when the file folder is installed in the drawer. Thus, the lateral spacing of channels 37, 38 of braces 35, 36 is chosen to match the lateral separation distance of drawer support rails 28, 29. In use, one or more documents are inserted into the folder space between leafs 31, 32 of the file folder 30, and the file folder 30 is installed in one of the cabinet drawers by manipulating the file folder 30 downward into the cabinet drawer until the channels 37, 38 are received by the support rails 28, 29. When the document is to be retrieved, the cabinet drawer is opened, the file folder 30 is either spread apart by the user and the desired document is removed from the folder 30, or the folder 30 itself is removed from the support rails 28, 29, spread apart, and the desired document is removed.

Figure 3:
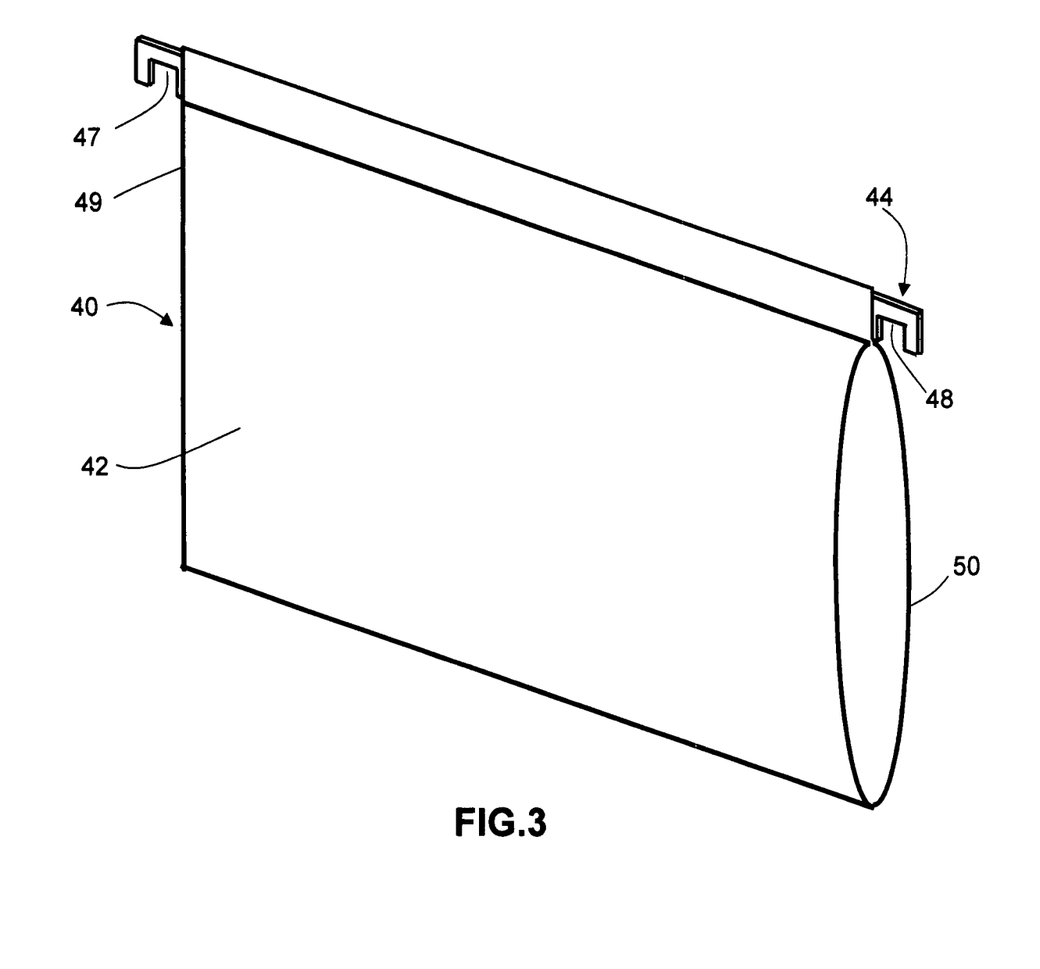
FIG. 3 is a perspective view of an alternate object receptacle in the form of a file folder also designed for use with the file cabinet of FIG. 1.

FIG. 3 is a perspective view, taken from the right front, of an alternative folder adapted for use with the invention. As seen in this Fig., a secure document receptacle generally designated with reference numeral 40 has a main body portion 42 fabricated from a single sheet of suitable material such as the same type of durable paper stock used in the fabrication of the file folder 30 of FIG. 2. Alternatively, main body portion 42 may be fabricated from a suitable sheet plastic material. Receptacle 40 is formed by folding the sheet stock about the longitudinal center and joining the upper and lower edges together. A single support brace 44 is secured to the upper edges of receptacle 40 by folding one edge of the sheet stock over the main body portion of support brace 44 and securing this one edge to the other edge of the sheet stock as shown in FIG. 3. The two edges of the sheet stock may be secured together using a suitable adhesive and pressure or heat bonding to create a secure bond between the two edges.

Support brace 44 has a pair of downwardly opening channels 47, 48, adjacent the opposite ends thereof and designed to receive the drawer support rails 28, 29 of a cabinet drawer when the receptacle 40 is installed in a drawer. Thus, the lateral spacing of channels 47, 48 of brace 44 is chosen to match the lateral separation distance of drawer support rails 28, 29.

The fabrication of receptacle 40 is completed by sealing one of the side edges of the partially formed receptacle 40, such as the left edge 49 shown in FIG. 3.

The completed receptacle 40 is closed at the top, bottom and one side edge, which restricts access to the interior of the receptacle 40 to the open side edge 50. Consequently, a document can only be inserted into or removed from a receptacle 40 via the open edge 50.

In use, with the receptacle 40 removed from a cabinet drawer, one or more documents are inserted into the interior of receptacle 40, after which the receptacle 40 can be installed in a cabinet drawer and positioned with the support brace channels 47, 48 engaged with the drawer support rails 28, 29. In this attitude, no document can be removed from the interior of the receptacle 40 unless the receptacle 40 is manipulated upwardly in the cabinet drawer a sufficient distance to allow access to the open side 50 of the receptacle 40. This guarantees that the support brace 44 will lose contact with the drawer support rails 28, 29, an event which can be detected by known sensing circuitry installed in the cabinet.

Figure 4:
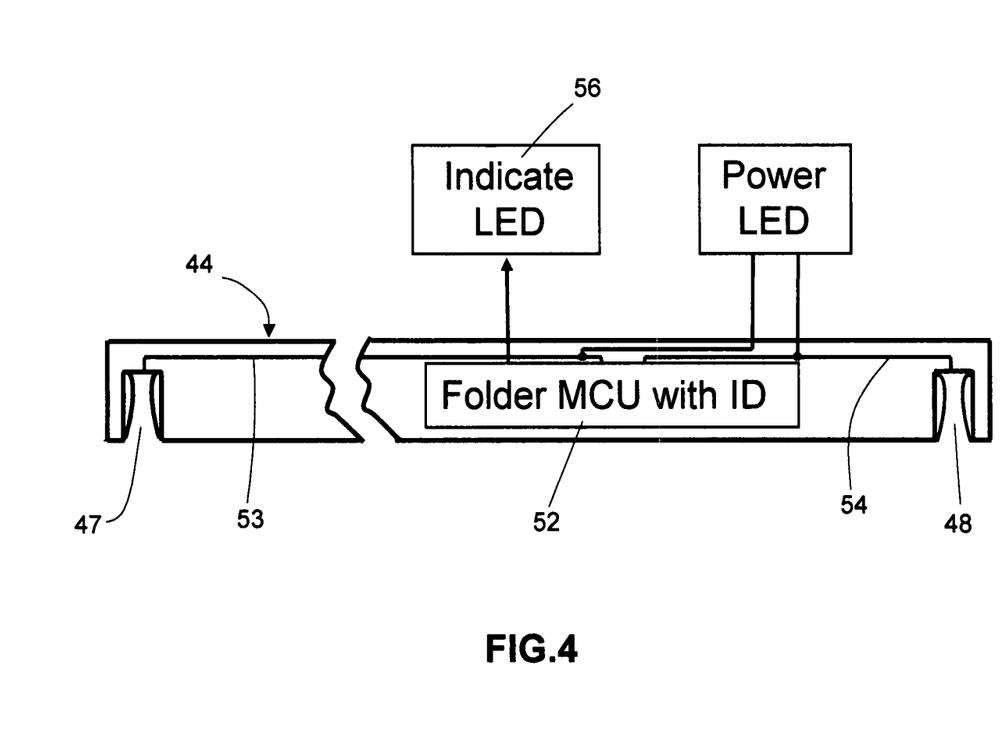
FIG. 4 is a schematic block diagram showing the principal circuit elements provided in the object receptacle according to the invention.

Each folder 30, 40 is provided with the circuit elements depicted in FIG. 4. As seen in this Fig., support brace 44 of the FIG. 3 file folder 40 has an object receptacle microcontroller 52 mounted thereon. Object receptacle microcontroller 52 is preferably a type PIC 10F202 device available from Microchip Technology, Inc. of Chandler, Arizona and incorporates a memory unit for storing information which identifies the file folder when this information is accessed by an external device. Object receptacle microcontroller 52 is ohmically connected to support brace channels 47, 48 via conductive paths 53, 54 formed on the surface of support brace 44, which is fabricated from an electrically insulative material. Object receptacle microcontroller 52 is also coupled to an indicator LED 56, which is mounted on the upper margin of support brace 44. Indicator LED is activated by object receptacle microcontroller 52 whenever an address signal matching the identification of file folder 40 is presented to object receptacle microcontroller 52. A power LED mounted on the upper margin of support brace 40 is coupled to conductive path 54 and is activated whenever current flows along path 54, which occurs whenever support brace channels 47, 48 are ohmically connected to conductive portions of drawer support members 28, 29 (FIG. 1).

The arrangement of the FIG. 4 circuit elements on the FIG. 2 file folder 30 is essentially the same as that described for the file folder 40 of FIG. 3, with the exception that the circuit elements are mounted on only one of the two support braces 35, 36.

Figure 5:
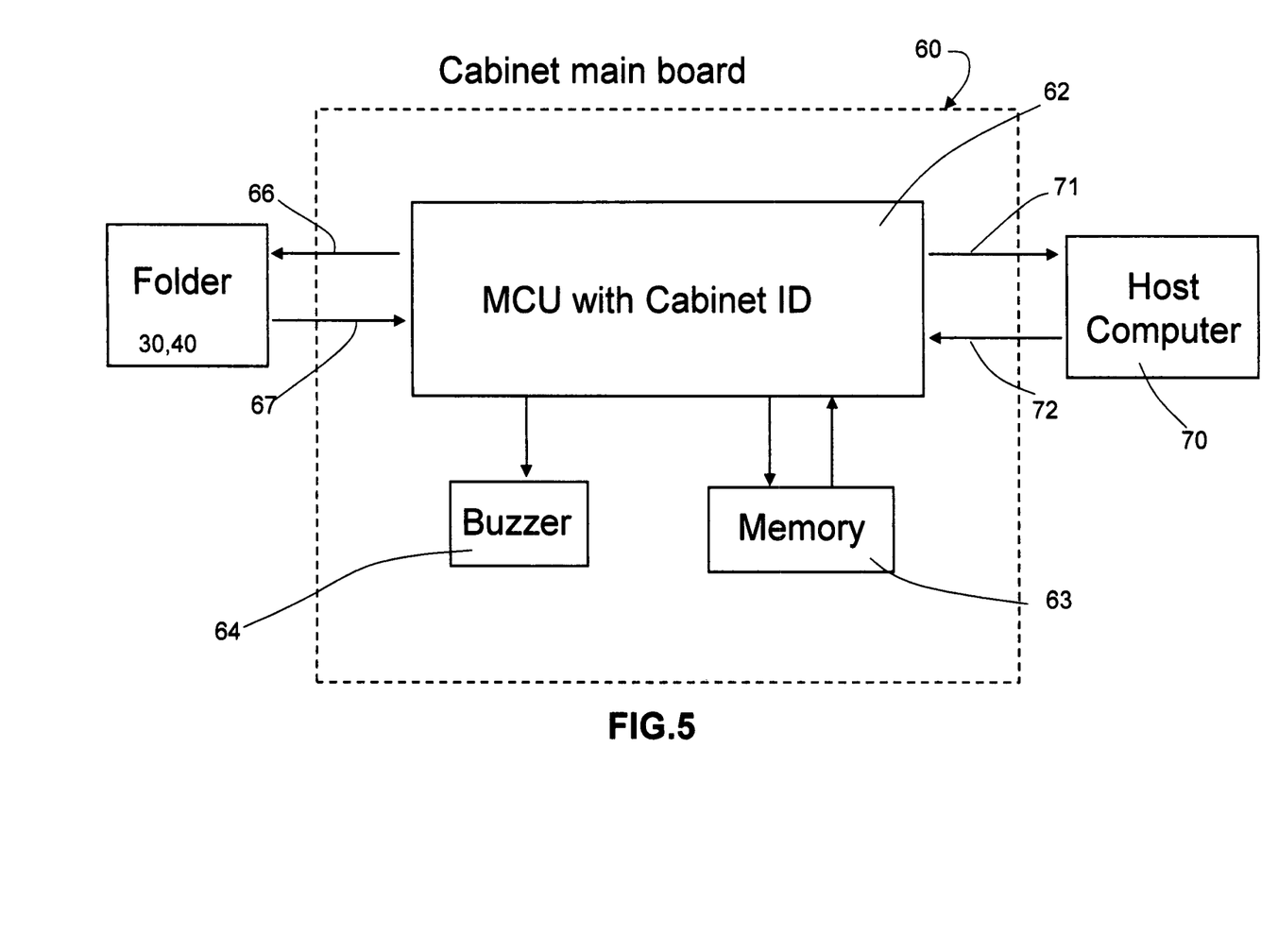
FIG. 5 is a schematic block diagram showing the principal circuit elements provided in the object container according to the invention.

Each file cabinet 10 depicted in FIG. 1 is provided with the circuit elements shown in FIG. 5 within the dotted rectangular outline. As seen in this Fig., a main cabinet circuit board 60 has mounted thereon an object container microcontroller 62, a memory unit 63, and an audible indicator ("Buzzer") 64. Object container microcontroller 62 is preferably a type LPC1766 device available from NXP Semiconductor Corporation of Eindhoven, The Netherlands.

Memory unit 63 may be any memory device which is compatible with object container microcontroller 62 and has sufficient capacity to store file folder information for the maximum number of file folders 30, 40 which can be accommodated by a file cabinet 10. Audible indicator 64 may be any device capable of being driven by object container microcontroller 62 in the manner described below. Object container microcontroller 62 is configured to communicate with a host computer 70 either via hard wired conductors 71, 72 or via a wireless communication link. Object container microcontroller 62 communicates with individual file folders via communication links 66, 67 which include conductive paths formed on drawer support members 28, 29 with which file folder channels 37, 38 and 47, 48 make ohmic contact when a file folder 30, 40 is properly installed in a cabinet drawer.

Object container microcontroller 62 can respond to information requests from host computer 70 in several ways. Host computer 70 may send a request to find a specific file folder 30, 40 to object container microcontroller 62. Upon receipt of such a request, object container microcontroller generates the address signals for that specific file folder 30, 40 and places these signals on the conductive paths of support members 28, 29 via communication links 66, 67. If the specified file folder 30, 40 is present in that cabinet, object container microcontroller 62 activates the visible indicator device 27 on the drawer containing the specified file folder 30, 40, unlocks the drawer (if a drawer lock is provided), and waits for a confirmation signal from the object receptacle microcontroller 52 of the specified file folder 30, 40. Upon receipt of the confirmation signal, object container microcontroller 62 sends an information signal to host computer 70 indicating that the specified file folder 30, 40 has been located in that cabinet and the drawer location of the located specified file folder 30, 40. If object container microcontroller 62 does not receive a confirmation signal, an information signal is sent to host computer 70 indicating that the specified file folder 30, 40 was not located. In response, host computer 70 can update the master system data base to reflect this information.

Host computer 70 may send a request to send an update of the object identification contents of the cabinet in which the object container microcontroller is located. In response to such a request, object container microcontroller 62 reads this information from memory device 63 and send this information to host computer 70. In this way, the master system data base can be quickly updated on a periodic or random basis.

An important function performed by the object container microcontroller 62 is the periodic polling of the object receptacle microcontrollers 52 located in the individual file folders 30, 40. In particular, object container microcontroller 62 is configured to place a polling request on communication links 66, 67 in a periodic manner, preferably every second in the preferred implementation of the invention. In response to the polling request, each object receptacle microcontroller 52 operationally located in that cabinet responds with its identification and this information is stored in memory device 63 by object container microcontroller 62. Object container microcontroller 62 also compares the received identification information with the identification information previously stored in memory device 63. If any identification is missing from the received responses, object container microcontroller 62 erases this identification from memory device 63 and sends this result to host computer 70 to update the master system data base. If new identification information is included in the received responses (indicating that a new file folder 30, 40 has been added to the cabinet), object container microcontroller 62 enters this identification into memory device 63 and sends this result to host computer 70 to update the master system data base. In addition, object container microcontroller operates the audible indicator 64 to provide an indication to a user at the cabinet that the new file folder 30, 40 has been noted and entered into the system.

As will now be apparent, collective objects management systems incorporating the invention provide improved object data base management over the serial polling technique described above according to which the polling is controlled by the host computer. Rather than requiring the host computer to generate the specific object identification information and wait for a response until the next specific object identification information can be generated, the polling function can now be performed locally and periodically at the site of the object container microcontroller and the results transferred to the host computer whenever the host computer makes such a request. Also, the provision of an audible confirmation to the addition of a new object to the collection provides positive feedback to the local user.

Although the above description is devoted to an implementation of the invention in the field of file management systems, the invention has much wider application. In general, the invention can be used in any collective object management system in which the need exists for a technique for rapidly identifying a given class or type of object from a collection of objects. For example, in an automotive parts warehouse operation, the objects may be individual vehicle parts (such as carburetors, alternators, gaskets or the like) stored in bins on shelves. In a manufacturing operation, the objects may be the individual items manufactured in the plant (such as different types of integrated circuits manufactured by an integrated circuits manufacturer) contained in individual packages. In any application, the object container microcontroller 52 and LED indicator 56 associated to a specific object are closely coupled to the object itself and electrically coupled to the local object container microcontroller 62 so that the circuits can respond to the reception of a desired object address and activate the indicator 56 in such a way that a human operator can locate the object specified by the address.

Although the above provides a full and complete disclosure of the preferred embodiments of the invention, various modifications, alternate constructions and equivalents will occur to those skilled in the art. For example, while the invention has been described with reference to specific microcontroller devices, other comparable devices may be employed, depending on the preferences of the system designer. Moreover, while the indicators 27, 56 have been described as visible indicators, other types of indicators, such as audible indicators, may be used, if desired. In addition, while the specific circuitry has been described with reference to a single file cabinet, it is understood that the invention may be implemented using multiple file cabinets positioned at the same or different locations in an office. Further, the invention may be used to manage a file system of many cabinets positioned at different physical locations using an internal or an external computer network, if desired. Therefore, the above should not be construed as limiting the invention, which is defined by the appended claims.

What is claimed is:

1. A system for managing objects distributed in an object location space, said system comprising:

a container having a plurality of mutually electrically isolated electrically conductive paths;

a container microcontroller coupled to said plurality of mutually electrically isolated electrically conductive paths for supplying address and control signals to said paths, said container microcontroller having terminals for receiving information signals from a host computer and for supplying information signals to the host computer;

a plurality of object receptacles positioned in said container, each of said plurality of object receptacles having (a) a plurality of electrically conductive members, each of said plurality of electrically conductive members of each of said plurality of object receptacles being electrically coupled to a different one of said plurality of mutually electrically isolated electrically conductive paths, one of said electrically conductive paths being provided to receive address signals supplied by said container microcontroller, another one of said electrically conductive paths being provided to send response signals from said plurality of object microcontrollers to said container microcontroller;

(b) an object receptacle microcontroller associated to said object, said object receptacle microcontroller having a unique system address, said object receptacle microcontroller further having two electrically conductive terminals each in electrical contact with a different one of said plurality of electrically conductive members;

(c) an indicator coupled to said object receptacle microcontroller for activation whenever said object receptacle microcontroller detects an address signal supplied by said container microcontroller present on said one of said plurality of electrically conductive members and representative of said unique system address;

said object receptacle microcontroller being configured to respond to a polling signal from said container microcontroller by generating a signal including said unique system address on one of said plurality of electrically conductive members, said container microcontroller including a memory device for storing information signals identifying all object receptacle microcontrollers in the container and the location in the container of such object receptacle microcontrollers, said container microcontroller being configured to supply said address signals via said one of said electrically conductive paths to said object receptacle microcontrollers, to periodically generate said polling signal, and to receive said signal including said unique system address generated by said object receptacle microcontroller in response to said polling signal, said container microcontroller being further configured to compare each information signal received in response to the generation of said polling signal with said information signals stored in said memory device, and to store in said memory device any received information signal not present in said memory device, said container microcontroller being further configured to delete from said memory device any stored information signal not included in those information signals received in response to the generation of said polling signal, said container microcontroller being further configured to respond to a data base update request signal from the host computer by sending said information signals stored in said memory device to the host computer.

2. The system of claim 1 wherein said indicator is a visible indicator.

3. The system of claim 2 wherein said visible indicator is an LED.

4. The system of claim 1 wherein said container comprises a file folder drawer; and wherein said plurality of object receptacles each comprises a file folder having at least one support brace, said at least one support brace containing said plurality of electrically conductive members; and wherein said object receptacle microcontroller and said indicator of each of said plurality of object receptacles are carried by said at least one support brace.

5. The system of claim 4 wherein each said file folder has an upper margin; and wherein each said indicator is mounted to the corresponding file folder in a position extending above said upper margin so that a given indicator is visible when the file folder drawer is in an opened position.

6. The system of claim 4 wherein said file folder drawer has a front panel having an additional indicator mounted thereon; and wherein said system further includes circuitry for operating said additional indicator whenever an object receptacle microcontroller located in said file folder drawer detects an address signal present on said one of said plurality of electrically conductive members and representative of the unique system address of that object receptacle microcontroller.

7. The invention of claim 1 wherein said container includes an audible indicator coupled to said cabinet microcontroller via at least one of said plurality of mutually electrically isolated electrically conductive paths; and wherein said cabinet microcontroller is configured to activate said audible indicator when a received information signal is stored in said memory device.

8. The invention of claim 1 wherein said container microcontroller is configured to send to the host computer the identity of an information signal deleted from said memory device.

9. The invention of claim 1 wherein said container microcontroller is configured to respond to the receipt of an object identification signal from the host computer by generating said address signals.

* * * * *